(12) United States Patent
Rizzo et al.

(10) Patent No.: US 6,470,338 B1
(45) Date of Patent: Oct. 22, 2002

(54) COMPUTERIZED SYSTEM AND METHOD FOR ASSISTING POTENTIAL CLIENTS TO IDENTIFY AND APPROPRIATE PROVIDER FOR PROFESSIONAL SERVICES

(75) Inventors: David Rizzo, Bedminster, NJ (US); Michael J. Custode, North Caldwell, NJ (US)

(73) Assignee: Lawyershomepagenetwork, Inc., Kearny, NJ (US)

( * ) Notice: Subject to any disclaimer, the term of this patent is extended or adjusted under 35 U.S.C. 154(b) by 93 days.

(21) Appl. No.: 09/611,856

(22) Filed: Jul. 7, 2000

Related U.S. Application Data
(60) Provisional application No. 60/143,056, filed on Jul. 9, 1999.

(51) Int. Cl.[7] .............................................. G06F 17/30
(52) U.S. Cl. ............................................. 707/6; 707/10
(58) Field of Search ............................... 707/6, 1, 3, 5, 707/10, 103; 705/37, 38, 1

(56) References Cited

U.S. PATENT DOCUMENTS

| | | | | |
|---|---|---|---|---|
| 5,664,115 A | * | 9/1997 | Fraser ........................... | 705/37 |
| 5,878,416 A | * | 3/1999 | Harris et al. .................. | 707/10 |
| 5,940,812 A | * | 8/1999 | Tengel et al. ................. | 705/38 |
| 5,974,406 A | * | 10/1999 | Bisdikian et al. ............. | 707/1 |
| 6,061,681 A | * | 5/2000 | Collins .......................... | 707/5 |
| 6,216,132 B1 | * | 4/2001 | Chandra et al. ............. | 707/103 |
| 6,272,467 B1 | * | 8/2001 | Durand et al. ................. | 705/1 |
| 6,311,178 B1 | * | 10/2001 | Bi et al. ........................ | 707/3 |

* cited by examiner

Primary Examiner—Sanjiv Shah
(74) Attorney, Agent, or Firm—Duane Morris LLP; Arthur L. Plevy

(57) ABSTRACT

A computerized method for matching potential clients with professional services providers which meet their personalized criteria and are interested in providing particular services to them including the steps of: presenting a first electronic document including a plurality of data entry devices to the potential clients via a computer network; receiving data entered using the data entry devices, the received data being indicative of the criteria; automatically comparing the received data to data stored in a storage medium to identify one or more suitable professional services providers; automatically generating and transmitting via the computerized network an electronic mail message to the identified one or more service providers, the electronic message including information indicative of a portion of the received data; and, receiving a response from at least one responding one of the one or more identified service providers, and automatically providing information indicative of another portion of the received data to the responding one of the service providers.

21 Claims, 11 Drawing Sheets

CASEMATCH

Search   Esqort   About Us   Membership   Home   Contact Us

CaseMatch is a new and exciting service offered by LHN that allows consumers or businesses that are in need of legal services to reach the maximum number of attorneys with the minimum amount of effort.

To utilize CaseMatch is as easy as:

1. Click on "Enter New Case".
2. Complete case information on the input form.
3. CaseMatch will search our directory of thousands of attorneys and will send a message to every firm that meets your criteria.
4. The attorney will then come to CaseMatch to review the specific information that you entered.
5. If they are interested in your Case they will then contact you directly.

40 — Enter a new Case.        Delete a Case. — 50

FIG. 2

LAWYERS HOMEPAGE NETWORK INC

CASEMATCH

Search    Esqort    About Us    Membership    Home    Contact Us

To utilize CaseMatch is as easy as: —70

1. Complete case information input form below.
2. CaseMatch will search our directory of thousands of attorneys and will send a message to every firm that meets your criteria.
3. The attorney will then come to CaseMatch to review the specific information that you entered. —90
4. If they are interested in your Case they will contact you directly.

Please complete the following CaseMatch Information:

1. I would like to find attorneys that practice in any of the following state(s):

[Alabama / Alaska / Arizona / Arkansas / California] —100

2. I would like an attorney that practices the following law:

● Any of the following
   ○ All of the following

[Administrative Law / Admirality Law / Adoption / Anti-Trust Licensing / Appeals / Arbitration & Mediation / Automobile Accident] —110

3. I would like a firm that contains the following number of attorneys: [Any Size ▼] —120

4. Please enter general information about the case:

[                    ] —130

5. Please enter some general comments about the case:

[                    ] —140

6. Approximate budget for case: [       ] —150
7. First Name: [          ] —160
8. Last Name: [          ] —170
9. Email Address: [          ] —180
10. Phone Number: [          ] —190

[Submit] —200

FIG. 3

Respected Members, A new entry to CaseMatch that applies to you!

To: Respected Members
From: Angela Pandiscia <apandiscia@lawyershomepage.com>
Subject: A new entry to CaseMatch that applies to you!
Cc:
Bcc:
Attached:

```
******************************************************************
 CaseMatch 
******************************************************************
 A new Case in CaseMatch applies to you. 
 
 Case ID: 70686LFAT 
 
 Date Submitted: Wed Jun 09 17:13:59 1999 
 
 Case Information: I am a 40 year old woman and I fell at the 
 A&P near my home.  The floor was slippery as if they just cleaned
 it.  My back and leg were injured and I am in extreme pain.  What
 can I do?
 
 Case Comments: I need a response immediately. 
 
 Approx. Budget: $5,000.00 
 
 To review this Case go to: 
 www.lawyershomepage.com/casematch/casereview.html 
 Lawyers Homepage Network: www.lawyershomepage.com 
```

FIG. 5

CASEMATCH REVIEW

Search   Esqort   About Us   Membership   Home   Contact Us

Case#: 706861fat   Date Submitted: 6/7/99 2:50:04 PM

Contact Information:

Name: John Doe   Email: jdoe@newpoint.com

Phone: 555-1234

Budget: 5000

Case Information:
We are an insurance company looking for information on the new laws regarding the sale of point of service plans in the state of New Jersey.

Case Comments:

In the following states:
New Jersey

Firm Size: Any size

Download this information as a text file —370
Email this information to a colleague —380
Reply to this case. —390

FIG. 7

COMPUTERIZED SYSTEM AND METHOD FOR ASSISTING POTENTIAL CLIENTS TO IDENTIFY AND APPROPRIATE PROVIDER FOR PROFESSIONAL SERVICES

CROSS REFERENCE TO RELATED APPLICATION

This application claims the benefit of provisional patent application serial No. 60/143,056, entitled "COMPUTERIZED SYSTEM AND METHOD FOR ASSISTING POTENTIAL CLIENTS TO IDENTIFY AN APPROPRIATE PROVIDER FOR PROFESSIONAL SERVICES" filed on Jul. 9, 1999, the entirety of which is hereby incorporated by reference.

FIELD OF INVENTION

The present invention relates generally to techniques for providing professional services, and more particularly to a computerized method for matching potential clients with organizations which meet their personalized criteria and are interested in providing particular services to them.

BACKGROUND OF THE INVENTION

Often finding a service provider that meets ones criteria is a difficult and daunting task. For example, it can often be challenging for a potential client to find an attorney who is both skilled in a pertinent area of law and willing to undertake a specific task or case. Often, time is wasted interviewing firms that either lack the necessary expertise or are unwilling to take on a particular case for any of a number of reasons. Quite understandably, the same difficulty presents itself in many other fields, both professional and trade-related in nature for example.

Similarly, it can often be difficult for a provider of services, a law firm for example, to easily identify potential clients who have a matter which the particular service provider is both capable and willing to undertake.

Accordingly, it is highly desirable and an object of the present invention to provide a method, and system for implementing it, capable of aiding the matching of a service provider capable and willing to consider performing a specific task with a potential client for a particular matter.

SUMMARY OF THE INVENTION

A computerized method for matching potential clients with professional services providers which meet their personalized criteria and are interested in providing particular services to them including the steps of: presenting a first electronic document including a plurality of data entry devices to the potential clients via a computer network; receiving data entered using the data entry devices, the received data being indicative of the criteria; automatically comparing the received data to data stored in a storage medium to identify one or more suitable professional services providers; automatically generating and transmitting via the computerized network an electronic mail message to the identified one or more service providers, the electronic message including information indicative of a portion of the received data; and, receiving a response from at least one responding one of the one or more identified service providers, and automatically providing information indicative of another portion of the received data to the responding one of the service providers.

BRIEF DESCRIPTION OF THE FIGURES

Various objects, features and advantages of the invention will become more apparent by reading the following detailed description in conjunction with the drawings, which are shown by way of example only, wherein:

FIG. 2 illustrates a first computer page displayed according to a preferred embodiment of the present invention;

FIG. 3 illustrates a second computer page displayed according to a preferred embodiment of the present invention;

FIG. 5 illustrates an exemplary e-mail generated according to a preferred embodiment of the present invention;

FIG. 7 illustrates a fifth computer page displayed according to a preferred embodiment of the present invention;

DETAILED DESCRIPTION OF THE INVENTION

Figure 1A:
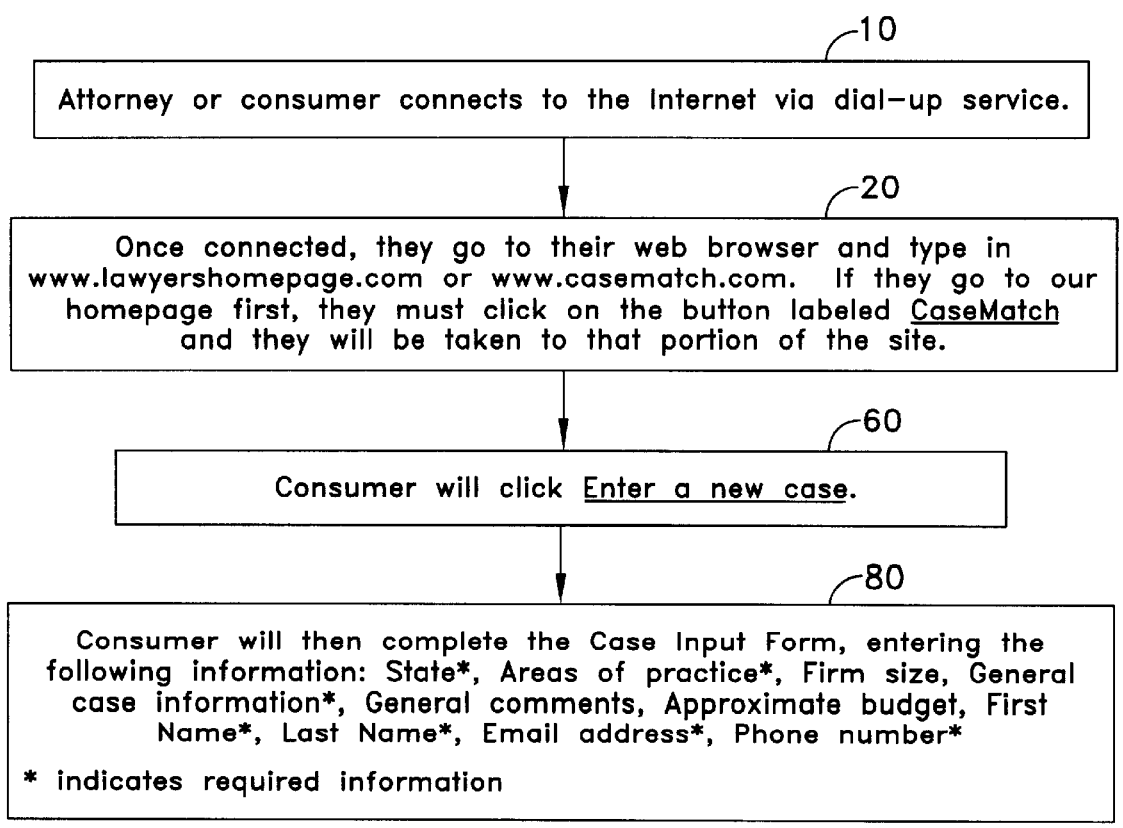
FIGS. 1A–1C illustrate a sequence of operations according to a preferred embodiment of the invention.

It should be understood that while the following discussion and the figures illustrate and explain the present invention as it relates to legal services, the present invention is equally applicable to a number of other businesses and service industries as well, and the selection of legal services has only been made for purposes of clarifying the explanation. Referring now to the figures wherein like references refer to like elements of the invention, FIG. 1A illustrates a first portion of a preferred sequence of operations according to a preferred embodiment of the invention.

Preferably, the system according to the present invention is accessible through the global interconnection of computers and computer networks commonly referred to as the "Internet". A potential client first accesses 10 the internet using any conventional means, e.g. a personal computer having a modem coupled to an Internet service provider using a standard phone line. Once connected, the potential client preferably accesses 20 a web page 30 which preferably prompts the potential client to enter a new service request using an Internet browser, such as Netscape Navigator or Microsoft Internet Explore for example, which is run on the potential client's Personal Computer (PC) or other suitable microprocessor based device.

Referring now also to FIG. 2, therein is illustrated a preferred form of web page 30 which includes hypertext markup language ("HTML") links 40 and 50. Link 40, upon activation by the potential client (for example by clicking on it with a mouse connected to the potential client's PC), preferably enables a user to enter 60 a new matter request by forwarding the potential client to web page 70 which is adapted to enable the potential client to enter 80 information regarding the service being requested (see FIG. 3 also). Link 50, upon similar activation by the potential client to access a web page adapted to enable a user to delete a new matter request he previously entered. Referring again to FIG. 3, therein is illustrated the specific instance of a web page 70 adapted to enable the potential client to enter information regarding a legal matter which the potential user would like to retain a law firm to represent him in regards to. It should of course be recognized however, that the present invention is equally applicable to other services and types of professional service providers as well though.

Web page 70 preferably first includes instructions 90 for guiding a potential client through utilizing the present invention. As set forth, the web page 70 is preferably adapted to enable the potential client to enter 80 information is about the matter with which he is seeking legal assistance. To this end, web page 70 preferably includes data devices 100–200. List 100 includes all jurisdictions which any law firms which is a member of the system according to the present invention may practice in. In other words, all geographic locations where law firms which may be selected can be found. List 110 preferably provides, for selection, areas of specialization of law firms which can be contacted according to the present invention. Drop list 120 preferably allows the potential client to select the approximate size of the a law firm which he would like to engage. Window 130 preferably enables the potential client to provide a brief description of, and general information regarding the matter which he is seeking legal assistance. Similarly, window 140 preferably allows the potential client to enter some comments regarding the legal matter with which he is seeking legal assistance. Window 150 permits the potential client to enter an approximate budget for the legal matter and windows 160, 170, 180, and 190 allow the potential client to enter their name and contact information. Finally, button 200 provides a means for a client to submit the information entered 80, and hence the new matter request, to the system according to the present invention for distribution to appropriate member law firms and member attorneys for their consideration.

Upon activation of the submit button 200, the system according to a preferred embodiment of the present invention preferably checks the data which has entered 80 using the data devices 100–190 to determine if proper information has been entered. For example, the system preferably checks to see if selections were made using lists 90, 100, and 110, and whether information was entered using windows 130, 140, 150, 160, 170, 180, and 190. Further, the system preferably checks the form of the data entered using windows 180 and 190 to determine at least whether the entered e-mail address and telephone number appear to be in a proper format (e.g., xxx@xxx.xxx and xxx-xxx-xxxx). If the system determines improper information was entered, or data is missing, the system preferably prompts the potential client to either correct the improper data or enter missing data.

Figure 1B:
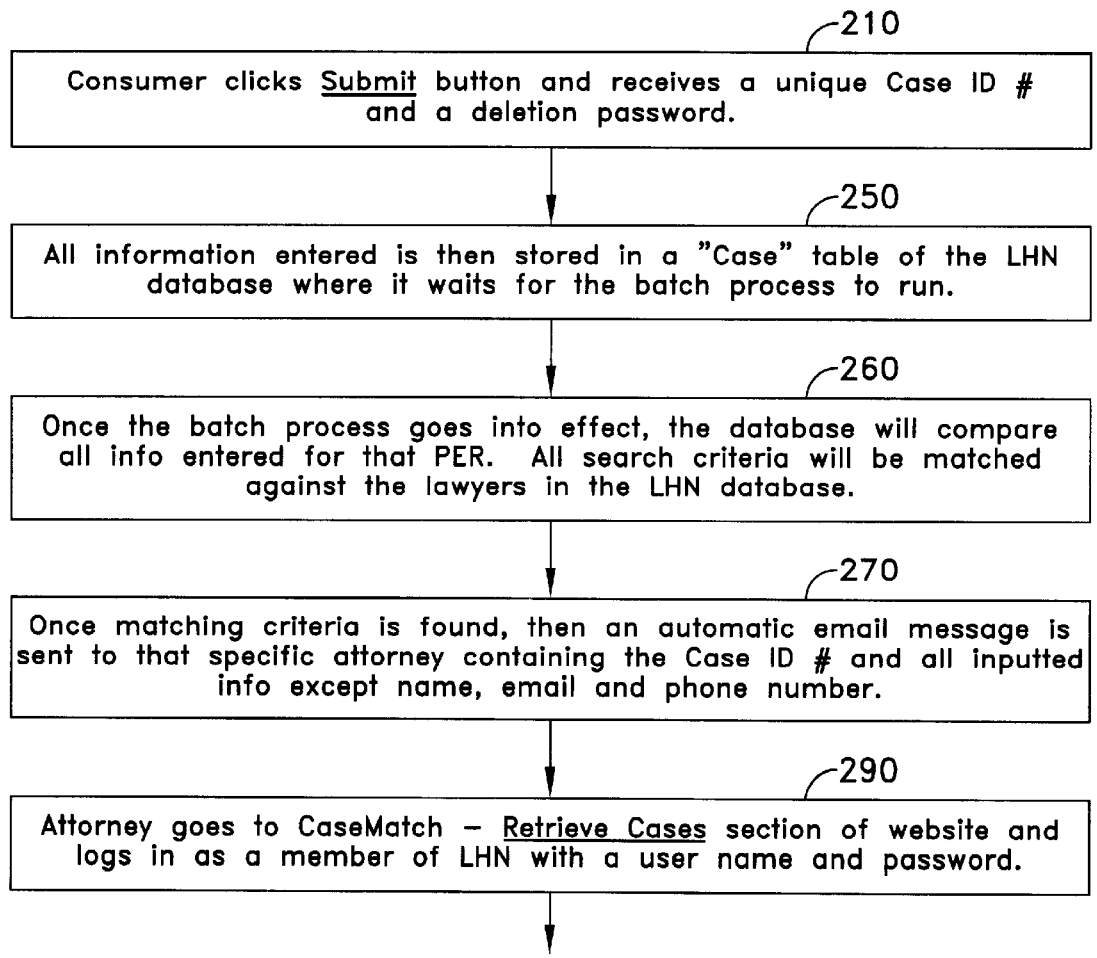
Figure 4:
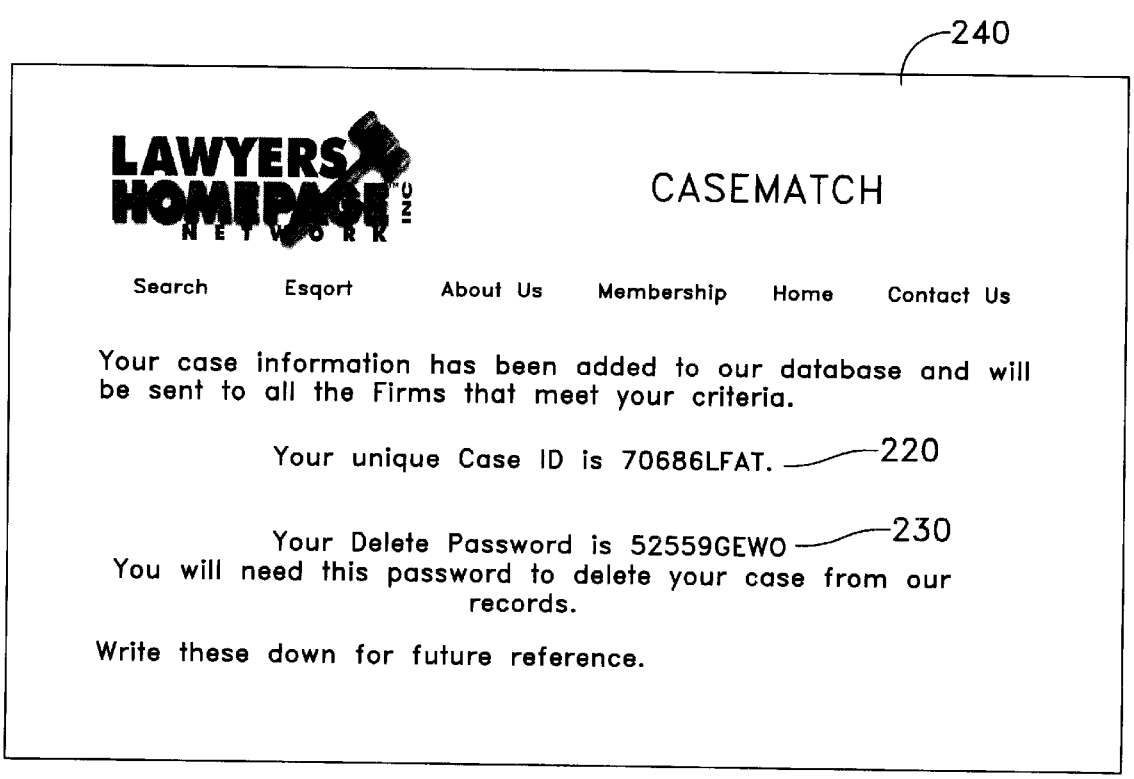
FIG. 4 illustrates a third computer page displayed according to a preferred embodiment of the present invention.

Referring now also to FIG. 1B, after the system has verified that the information entered 80 at least appears valid, the system according to the present invention preferably generates 210 a unique, or at least substantially unique matter ID 220 and password 230 to respectively identify and permit access to the entered information. All of this data entered 80, unique matter identification 220 and password 230 are then recorded 250 as a record into a database. Referring now also to FIG. 4, upon successful recordation 250, the system preferably generates a web page 240 for display to the potential client. Accordingly, the potential client receives a verification that his new matter has been entered into the system, and is provided the ID 220 and password so that the matter may be deleted or modified.

Referring again to FIG. 1B, at predetermined time intervals, or periods, a database query is preferably performed 260 to identify member law firms which satisfy the new matter requests which have been entered by potential clients. Preferably this occurs twice a day for example, although the selection of this time interval should depend upon the amount of new matter requests which are entered (i.e. more requests=a shorter interval between queries). Member law firms, and member individual attorneys, are preferably signed up with the system according to the preferred embodiment of the present system invention for a membership fee. When law firms and attorneys are signed as members they preferably provide similar information about themselves as was entered 80 by the potential clients, e.g., jurisdictions in which they practice, areas of expertise, size of law firm, and e-mail address. All new matters entered 80 by potential clients are then queried against this member law firm and member attorney information to identify those member law firms and attorneys who match the criteria of information entered 80 for each new matter request.

Referring now also to FIG. 5, the system according to the present invention then preferably automatically generates an e-mail 280 to each member law firm or attorney which has been determined to match criteria entered 80 for each new matter request. This e-mail 280 informs each matching member law firm or attorney that a match has been detected. E-mail 280 preferably includes that data entered 80 in windows 130, 140 and 150 (130', 140', and 140', respectively), as well as the ID 220 and date the request was submitted.

Figure 6:
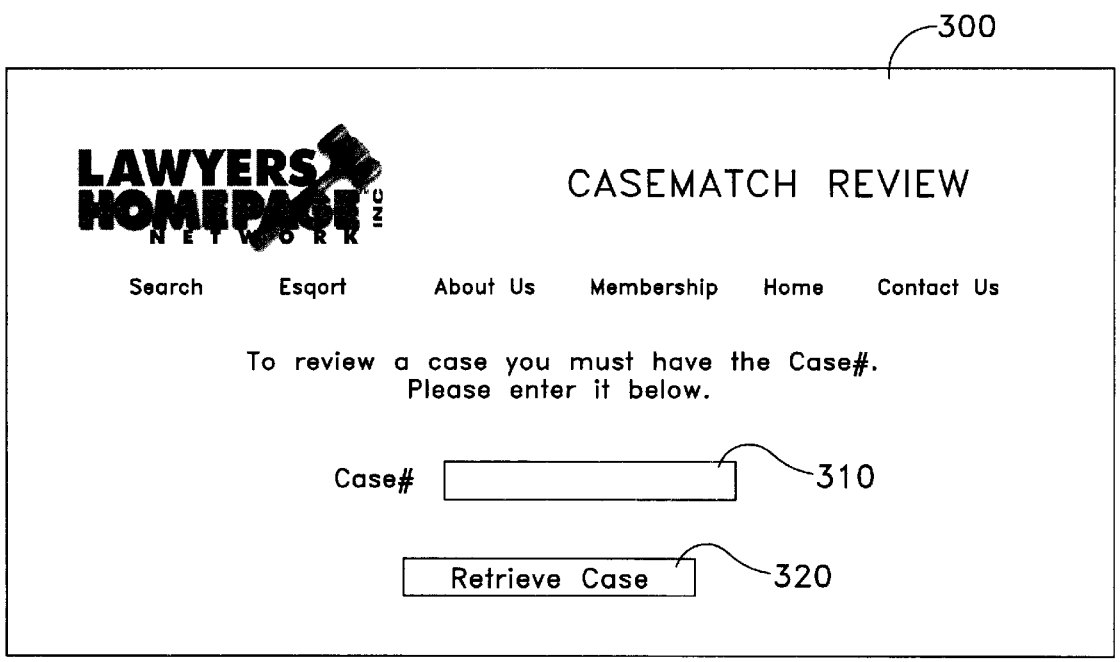
FIG. 6 illustrates a fourth computer page displayed according to a preferred embodiment of the present invention.

Referring now also to FIG. 6, upon receipt of the e-mail 280, each receiving member law firm or attorney may choose to access more information regarding the referenced new matter request by either activating the HTML link 290 or simply accessing a predetermined Uniform Resource Locator ("URL") address. Upon such, a web page 300 is preferably displayed, which enables a member law firm or attorney to access more information regarding any matter which has not been deleted or has expired based upon predetermined criteria.

Figure 1C:
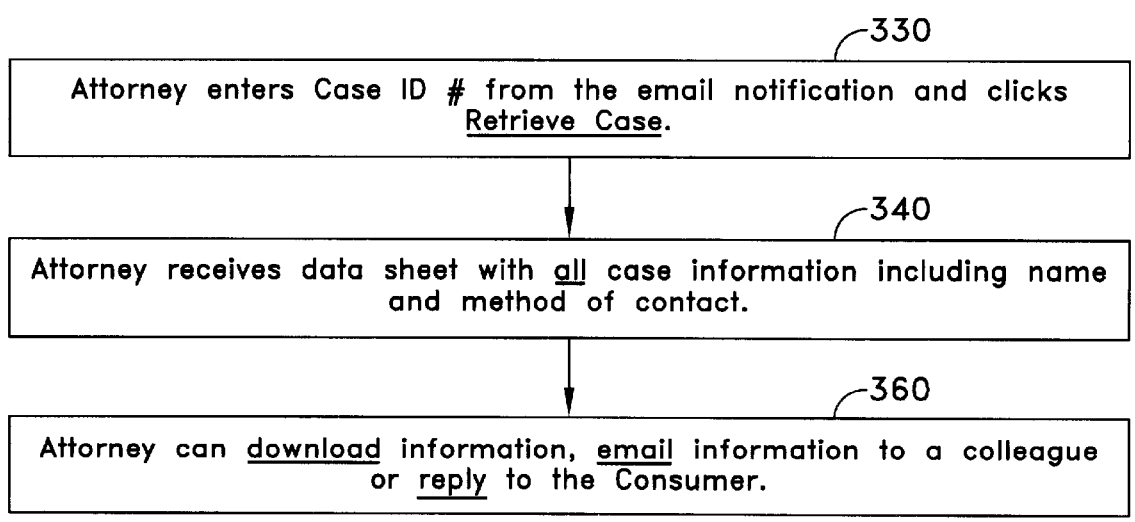

Referring now also to FIG. 1C, in the specific case of web page 300, window 310 enables a member law firm or attorney to enter 330 a particular ID 220 which the member wishes to access information about, and a button 320 for directing the system according to the preferred form of the invention to retrieve that information. In a preferred embodiment of the invention, an ID and password corresponding to the member law firm or attorney attempting to access the new matter request information must be entered before such information will be displayed.

Upon activation of the button 320, the system preferably generates 340 a web page 350 (see FIG. 7) which includes the information entered by the potential client regarding the new matter request corresponding to the ID 220 entered into the window 310. The member may then decide to either not respond at all to the request, download the information as a text file using HTML link 370, e-mail the information to someone else using HTML link 380 or reply directly to the associated potential client who entered the new matter request displayed on the page 350 using the HTML link 390.

In this way, a maximum number of service providers can be put into contact with a potential client in a minimum amount of time, which enables the potential client to make a highly informed decision with a minimal amount of effort.

In a preferred form of the invention, web pages are dynamically created and downloaded to the consumer's browser for display and interaction with. Such can be accomplished using Microsoft Active Server Pages (ASP) for example. Additionally, multiple database which are responsive to and utilized to dynamically generate the web pages are effected using Microsoft SQL server for example.

The database tables that are preferably used include: a cases table, a casemail table, a case response table, a zip code table, a master firm list table and a registered attorneys table. The cases table records cases which have been entered into the system and preferably includes at least: a unique case number; a case remove number; whether the consumer is an individual or a business; if an individual, the individual's first and last names; if a business, the business name; an e-mail address for responses to the consumer; a zip code for the consumer; a phone number for the consumer, if entered; which state the attorney should practice in; the area of practice for the desired attorney; time considerations; when a response is needed by, if entered; time consideration comments; and some general information about the case.

The casemail table preferably includes: information regarding a unique case number to which each record corresponds; the identity of a firm to which an e-mail has been sent for the case identified by the unique case identifier; the date that e-mail was sent; and, whether the case is still pending, i.e. not deleted. The case response table similarly preferably includes: information regarding a unique case number to which each record corresponds; the identity of a firm which has responded to an e-mail which was sent regarding the case identified by the unique case number; the date that response was sent; and, whether the case is still pending, i.e. not deleted.

The zip code table preferably includes a list of all zip codes within the United States, and a corresponding longitude and latitude for each of those zip codes. The master firm list table preferably includes the identities and contact information of firms that may be interested in using a system according to the present invention. The registered attorneys table preferably includes those firms and attorneys from the master firm list which have registered to use the system according to the present invention, and their corresponding user names and passwords.

Figure 8A:
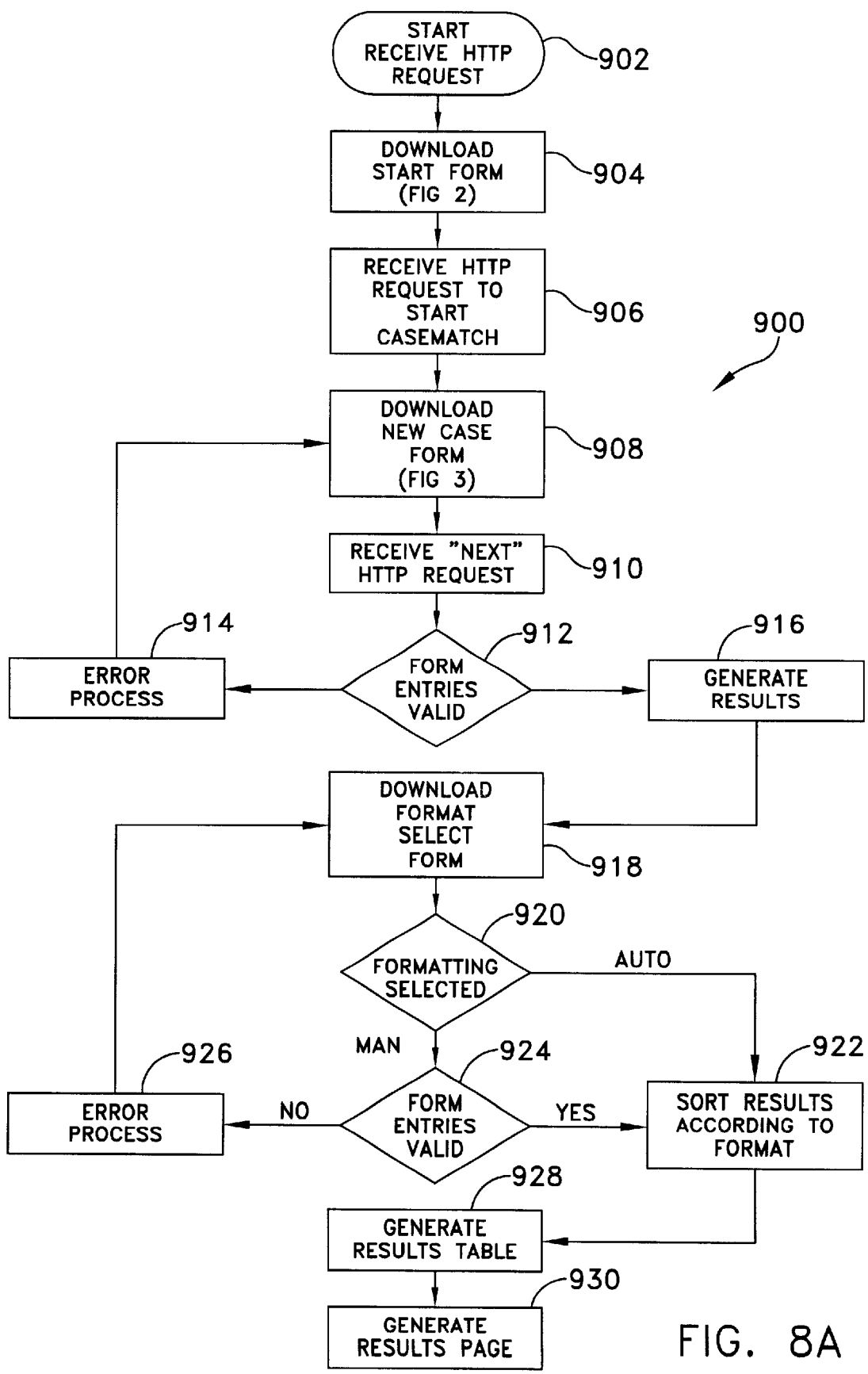
FIGS. 8a and 8b illustrate a flow diagram of the preferred form of the invention for entering a new case.
Figure 8B:
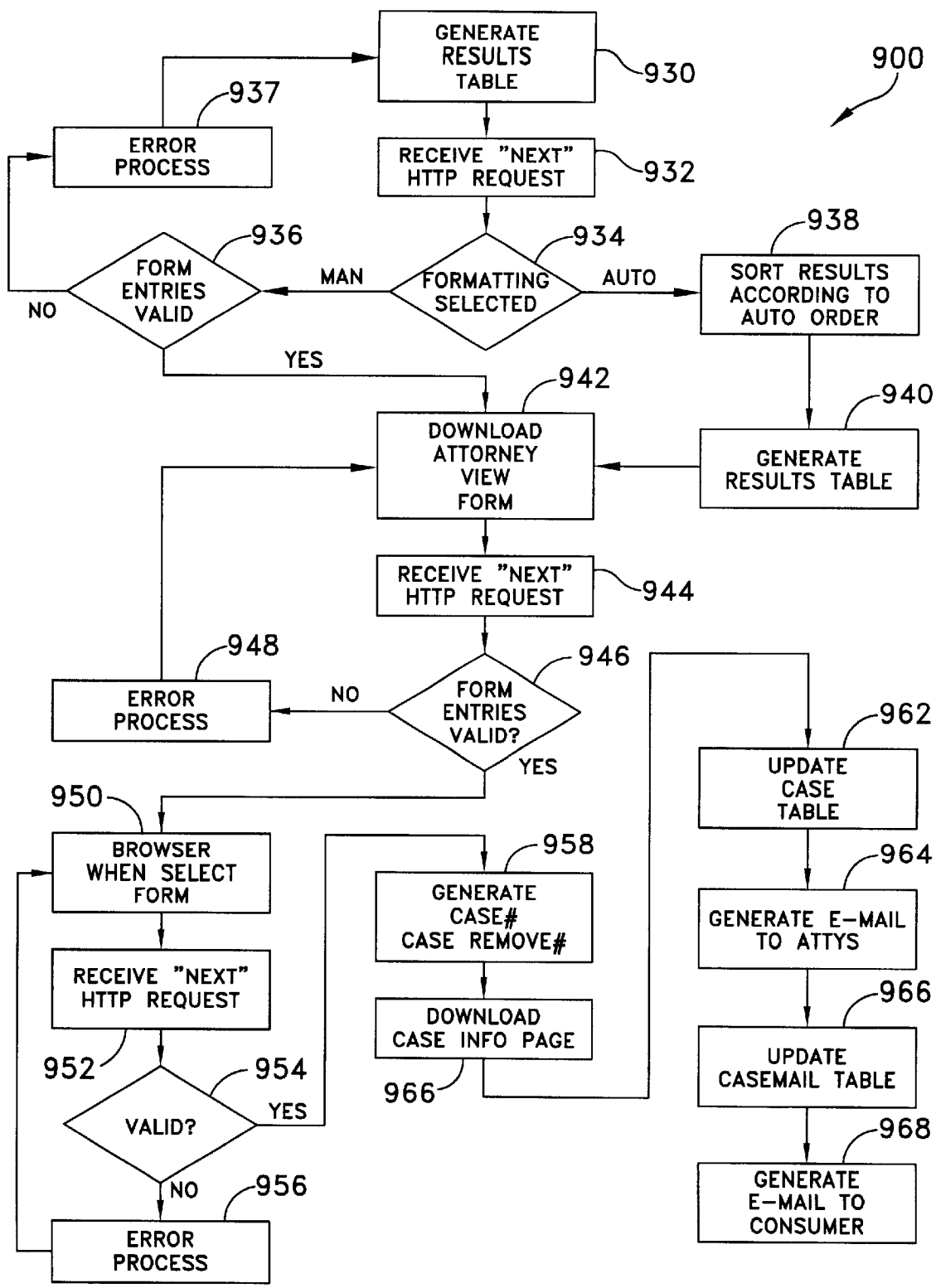

Referring now also to FIGS. 8A and 8B, therein is illustrated a flow diagram 900 of a preferred form of the invention for entering a new case. The method begins with the system receiving a request to access the system, such as a standard HTTP request to access www.casematch.com using a browser via a conventional Internet connection (step 902). Upon receipt thereof, a start page such as that illustrated in FIG. 2, is served (step 904) to the browser requesting it, which then displays it. A user then, upon reading the page 30, activates link 40 to enter a new case which is received by a system implementing the present invention (step 906). Upon receipt of request, a new case form 70 is served (step 908) to the browser requesting it, which then displays it in turn (see FIG. 3). A user, upon viewing the new case form 70, completes the same by using in data tools 100–190 (standard radio buttons, text windows and droplists as are well known and commonly utilized). When completed, the user preferably activates the "SUBMIT" button 200 which is received by the system according to the present invention (step 910).

Upon receipt of this request (step 910) and the data entered using tools 100–190 as is conventionally understood, the system reviews the data entered using tools 100–190 to see if they are valid (step 912). If they are not, for example if no data has been entered in one or more mandatory fields, an error process is invoked (step 914) which displays a message such as "The CaseMatch form was not completed accurately." Fields that need to be completed are preferably displayed in red, and a message such as "Please go back and correct the following errors" is displayed to the user via the browser (step 914). The system then lists those fields that have invalid entries, i.e. are missing or are of an improper format for example. The system then preferably displays the page 70 again to the user, except that the page 70 includes those responses previously entered using tools 100–190 by the user. Of course, a button can be provided which clears all data entered using tools 100–190 whenever activated, so a user may begin afresh.

Upon receipt of valid form entries (step 912), the system queries a master firms table for those attorneys and/or firms which meet the users received requirements as entered using tools 100–190, and generates a results table (step 916). A format selection page is then preferably served to the browser (step 918) so the user may select whether to use automatic formatting of the results or a custom format (step 920). If an automatic formatting is selected at step 920, than preferably the results generated at step 916 are queried and sorted by distance from the consumer's, or user's, zip code as entered (step 922). The system then generates a results table and serves it (step 928) to the user's browser for display consistently with the order determined. As the address of each firm/attorney returned by the query is known and the consumer's zip code is known, the distance can be easily calculated using conventional methods.

If, the consumer, or user, selects to manually format the results, it is determined whether the entered formatting, e.g. what order to display the results in is valid (step 924). If not, an error process is performed (step 926) similar to the error process performed regarding step 914, and the format selection form is served to the consumer's browser for correction or completion analogously to step 918. If the selected formatting is determined to be valid, than the results are sorted according to the selected format (step 922) and a results table generated (step 928).

A results page is then served (step 930) to the browser which includes the information in and is based upon the results table generated at step 928.

Upon receipt of this page and display thereof on a user's browser, the user can select either to display those firms/attorneys which match the criteria, i.e. are identified in the results table, in an automatic format or a custom format, using a radio button for example. Upon activation of a "NEXT" button (step 932) the system 920 the system determines whether the user selected automatic or manual formatting (step 934). More particularly, if manual formatting was selected, through use of radio button for example, the system determines if the number of results to display on each page is valid by checking that value entered in window (step 936). If valid, processing continues, if not valid, then the system performs error processing (step 937) analogous to that described. If manual formatting was selected, through the use of a radio button for example, then the results table which was generated in step 928 is resorted by that field selected (step 938), and processing continues. The system then regenerates the results table with the resorted data (step 922).

The system then serves to the user's browser an attorneys view form (step 942). A user can now select those attorneys whom he wishes to have the system contact regarding his newly entered case by checking appropriate boxes as is well understood and conventionally used. Preferably, the system calculates the total number of selected firms from the total number of checked boxes and displays that number for confirmation by the user, consumer. Upon activation of "NEXT" button (step 944) the system verifies that the user selection made, those firms or attorneys selected, are valid, i.e. at least one firm/attorney is selected (step 946). If the selections are not valid, error processing (step 948) occurs as has been described, and the system redisplays the attorneys view page discussed with regard to step 942.

Upon determining the selections are valid at step 946, the system serves a browser display select screen (step 950) to the user to allow a user to enter when the case he has just entered should become available for browsing by all registered attorneys/firms and not just those he opted to e-mail using the attorneys select page. Upon activation of a "NEXT" button (step 952), the system again determines whether the entries made using tools are valid (step 954), and if not performs error processing (step 956) as has been described and causes the browser select page to be redisplayed with the values that have previously been entered by the user. Upon validation of the browser information entered, the system generates a case identifier and case removal identifier (step 958). The generated identifiers are then included on a served identifiers page to the consumer's browser (step 960). Essentially, the case identifier is a unique identification associated with the record of the case, while the case removal identifier serves as a password for deleting the case record.

The system then preferably updates a case table including each of the case records to include a new record for the case that has just been entered by the user (step 962). The system then preferably automatically generates an e-mail to each attorney selected by the consumer (step 964). In the preferred embodiment of the invention, only select information is forwarded to the attorneys selected, as all selected attorneys may not be registered members, and access should be limited to registered members as will be described. The system then preferably updates a casemail table to reflect each e-mail sent (step 966). Finally, the system preferably automatically generates an e-mail to the consumer confirming that e-mails have been sent to the requested attorneys (step 968). In an alternative form of the invention, the system waits a sufficient amount of time to verify no deliver errors have occurred prior to e-mailing the confirmation to the consumer at step 968. If an error does occur, further processing can be performed, such as informing customer service directly and automatically.

In the preferred form of the invention, there are two ways cases can be reviewed by attorneys/firms. The first is by responding to the automatically generated e-mail, while the second involves browsing cases which are still pending, i.e. have not been deleted. Referring first to the e-mail response method, as set forth, upon the selection of attorneys/firms by a consumer e-mails are automatically generated and sent. Upon receipt and reading of one of these automatically generated e-mails, the receiving attorney becomes aware of a potential client. However, in order to view details regarding this potential client the receiving attorney is preferably instructed to access a website to retrieve/display additional information as well as respond if desired. In the preferred form, each e-mail to each attorney/law firm includes a URL link which, when activated, enables the receiving attorney to directly access more information on the identified case. To accomplish this, the embedded URL link preferably includes a destination URL as well as the unique case identifier. Accordingly, when activated the URL link enables the receiving attorney to not only be forwarded to access the appropriate website, but to automatically access a dynamically generated webpage which includes further information about the case to which the receiving attorney is inquiring about. Alternatively, the inquiring attorney could access the system according to the invention using conventional techniques upon receiving the e-mail, and enter the unique case identifier using a web page. Either way, a case information is preferably generated using the information entered into the case table using conventional techniques.

In order to access a case information page in the preferred form of the invention, the individual inquiring must be registered with the system according to the present invention. This is easily accomplished by assigning each registered attorney a unique user ID and password which must be entered before access will be allowed. In one form of the invention, the user ID and password can also be included in the URL link embedded in the e-mail, so it to can be passed to the system automatically and hence not independently verified by the user, if desired.

Each generated case page preferably further includes a "Send Email" button. This button, when activated, preferably forwards the inquiring attorney to an e-mail page. Again, the e-mail page is preferably dynamically generated from the case table using conventional techniques. It should be noted however, that the consumer will often wish that their identity remain anonymous in contrast to conventional types of online services. Accordingly, the inquiring attorney can enter a message to be forwarded to the consumer into text window. Upon completion, the inquiring attorney activates a submit button and the system automatically generates an e-mail to the consumer without any further interaction by the inquiring attorney. In this way, the inquiring attorney can reply to the consumer's request without jeopardizing the anonymity of the consumer by disclosing a destination e-mail address.

Alternatively, registered attorneys/firms can browse pending cases, i.e. cases which have been entered and not deleted, to determine if they have an interest in the same. To accomplish the same, an inquiring attorney can access a browser page using conventional techniques, e.g., by entering www.casematch.com, and then following appropriate menu prompts. Using data tools like those discussed above, an inquiring attorney can query the cases table for cases which meet certain criteria (i.e. are in New Jersey, any practice area) and sort the matching cases in a desired order (i.e. first by practice area, then by whether the consumer is an individual or business, then by the requested response date and finally by budget for example). By selecting the number of results by page and activating a "Submit" button, the system preferably queries the cases database and generates and serves a page which displays the results. This served page preferably includes navigation tools to enable the inquiring attorney to view other results as is well known and summary information for each case which matches the criteria entered by the searching attorney. It further preferably includes a review button for each case returned and an e-mail button. The review button, upon activation forwards the inquiring attorney to a case information page regarding the case selected and the E-mail button has the same function as the "Send E-mail" button discussed.

A consumer can further decide to remove his case from the system, for example when he is no longer interested in pursuing it or has identified an attorney or firm to handle the case. To accomplish the same, the consumer preferably accesses a browser page as using conventional techniques (i.e. entering www.casematch.com and then activating a menu prompt or HTTP link to access the page). The consumer then enters the unique case identifier he was provided with into window and the case removal identifier he was provided with into text windows as prompted. Upon activating a "Continue" button, the system verfies that the unique case identifier and case remove number entered using page are valid and correspond to a single case, and if so generates and serves a confirmation page. If the data entered is not valid, error processing as discussed is again performed and case removal page is caused to be redisplayed to the user. Once the consumer verifies that the information contained is accurate, and that it indeed reflects the case he wishes to remove he activates the "Confirm Removal" button which causes the system to update the cases table to reflect the case has been removed (e.g., sets a deleted flag to true for example in the cases table).

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A computerized method for matching potential clients with professional services providers which meet their personalized criteria and are interested in providing particular services to them, said method comprising the steps of:

presenting a first electronic document including a plurality of data entry devices to said potential clients via a computer network;

receiving data entered using said data entry devices, said received data being indicative of said criteria;

automatically comparing said received data to data stored in a storage medium to identify one or more suitable professional services providers based upon said criteria;

automatically generating and transmitting an electronic mail message to said identified one or more service providers via said computer network, said electronic message including information indicative of a portion of said received data; and, receiving a response from at least one responding one of said one or more identified service providers, and automatically providing information indicative of another portion of said received data to each said responding one of said service providers.

2. The method of claim 1, wherein said first electronic document includes Hypertext Markup Language (HTML) information.

3. The device of claim 2, wherein said computerized network includes a global interconnection of computers and computer networks.

4. The method of claim 3, wherein said received data was entered using a commercially available browser software package.

5. The method of claim 1, further comprising checking said received data to confirm it is in a proper format.

6. The method of claim 1, further comprising: storing data indicative of said plurality of service providers on said storage medium.

7. The method of claim 1, further comprising automatically storing said received data on said storage medium.

8. The method of claim 7, wherein said received data includes information indicative of information selected from the group consisting of a service provider size, a service provider specialty, a location of services to be provided, an estimated budget for services to be provided and a general description of services to be provided.

9. The method of claim 8, further comprising assigning a unique identifier to each of said received data.

10. The method of claim 9, wherein said received data and unique number are stored in a record.

11. The method of claim 10, wherein said unique number is included in said electronic message.

12. The method of claim 1, wherein said comparing comprises periodically querying said storage medium.

13. The method of claim 1, wherein said professional services are legal services.

14. A system for matching potential clients with professional services providers which meet their personalized criteria and are interested in providing particular services to them comprising:

at least one server being communicable via a computer network;

an application executed by said at least one server;

a storage medium accessible by both said application and server; and, a plurality of suitable microprocessor based devices being communicable with said at least one server via said computer network;

wherein, said application is responsive to requests received by said at least one server from at least one of said suitable microprocessor based devices to present at least one electronic document including a plurality of data entry devices to said microprocessor based devices via said computer network;

wherein, said server receives data entered using said data entry devices and stores said data in said storage medium, said received data being indicative of said criteria;

wherein said application automatically compares said received data to said stored data to identify one or more suitable professional services providers;

wherein said application automatically generates and transmits via said computer network an electronic mail message to said identified one or more service providers, said electronic message including information indicative of a portion of said received data; and, wherein when said server receives a response from at least one responding one of said one or more identified service providers, said application automatically provides information indicative of another portion of said received data to said responding one of said service providers via said computer network.

15. The system of claim 14, wherein said services are legal services.

16. The system of claim 14, wherein a portion of said stored data is not accessible to said service providers.

17. The system of claim 14, wherein after a given time period, said application selectively automatically makes at least a portion of said stored information available to each of said service providers based upon said stored information.

18. The system of claim 14, wherein said received data includes information indicative of information selected from the group consisting of a service provider size, a service provider specialty, a location of services to be provided, an estimated budget for services to be provided and a general description of services to be provided.

19. The system of claim 14, wherein said comparing comprises periodically querying said storage medium.

20. The system of claim 14, wherein said suitable microprocessor based devices include computers executing a browser software application.

21. A system for matching potential clients with professional services providers which meet their personalized criteria and are interested in providing particular legal services to them comprising:

at least one server being communicable via a computer network;

an application executed by said at least one server;

a storage medium accessible by both said application and server; and, a plurality of suitable microprocessor based devices being communicable with said at least one server via said computer network;

wherein said application is responsive to requests received by said at least one server from at least one of said suitable microprocessor based devices to present at least one electronic document including a plurality of data entry devices to said microprocessor based devices via said computer network;

wherein said server receives data entered using said data entry devices and stores said data in said storage medium, said received data being indicative of said criteria;

wherein said application automatically compares said received data to said stored data to identify one or more suitable professional services providers;

wherein after a given time period, said application selectively automatically generates and transmits via said computer network an electronic mail message to said identified one or more service providers, said electronic message including information indicative of a portion of said received data; and, wherein when said server receives a response from at least one responding one of said one or more identified service providers, said application automatically provides information indicative of another portion of said received data to said responding one of said service providers via said computer network.

* * * * *